United States Patent

De Lancey

[15] 3,693,771
[45] Sept. 26, 1972

[54] CENTRIFUGAL CLUTCH
[72] Inventor: Warren H. De Lancey, Elyria, Ohio
[73] Assignee: Pioneer Products Company, Elyria, Ohio
[22] Filed: Sept. 8, 1970
[21] Appl. No.: 70,007

Related U.S. Application Data

[62] Division of Ser. No. 761,931, Sept. 24, 1968.

[52] U.S. Cl. ................. 192/105 CD, 64/26, 192/75, 192/103 B, 287/103
[51] Int. Cl. ........................................... F16d 23/10
[58] Field of Search........ 192/105 CD, 103 B, 55, 75, 192/107 M, 109 D; 64/15, 3, 26; 287/103

[56] References Cited

UNITED STATES PATENTS

| 846,193 | 3/1907 | Fellows | 192/105 CD |
| 2,099,915 | 11/1937 | Weatherhead | 64/3 |
| 3,003,609 | 10/1961 | Lang | 192/107 M |
| 3,240,301 | 3/1966 | Smith | 192/107 M |
| 3,197,004 | 7/1965 | Salsbury | 192/105 CD |
| 3,211,485 | 10/1965 | Peterson | 64/4 |
| 3,224,541 | 12/1965 | Yamamoto | 192/105 CD |
| 3,263,780 | 8/1966 | Melior | 192/105 CD |

*Primary Examiner*—Benjamin W. Wyche
*Assistant Examiner*—Randall Heald
*Attorney*—Cullen, Settle, Sloman and Cantor

[57] ABSTRACT

A centrifugal clutch having drive and driven members, the former including a disc and hub, a pair of weights with arcuate outer surfaces pivotally mounted at their adjacent one ends upon said disc and constrained to radial movements, a spring interconnecting their adjacent other ends in tension maintaining the weights in a radial inward "release" position, the driven member including a drum overlying and spaced from the disc and weights, and having a hub journalled on the disc hub, and a sleeve of friction material mounted upon and around the interior of said drum normally spaced from the weights.

And a modified clutch wherein the weight pivots are diametrically opposed, and spring interconnect the respective opposite ends of the weights.

1 Claim, 8 Drawing Figures

INVENTOR
WARREN H. De LANCEY
BY Cullen Sutter Sloman & Cantor
ATTORNEYS

INVENTOR
WARREN H. De LANCEY

BY
ATTORNEYS

INVENTOR

WARREN H. De LANCEY

BY
ATTORNEYS

CENTRIFUGAL CLUTCH

This application is a division of my copending application, Ser. No. 761,931, filed Sept. 24, 1968.

BACKGROUND AND BRIEF DESCRIPTION OF INVENTION

While centrifugal clutches are useful, and desirable in many applications, their use has been retarded by high manufacturing cost. It is an object of the present invention to simplify the construction and make it of materials which can be fabricated rapidly in high production with a minimum of subsequent operations.

It is the usual purpose of a centrifugal clutch to connect a rotating shaft to a driven load after a predetermined speed has been reached, and to disconnect that load in case the speed of the rotating shaft drops below a specified RPM. Thus the power source is only connected to the load after it has attained a predetermined speed. As in the case of internal combustion engines, and certain types of electric motors, the torque at low rotating speeds, is minimal, and it is desirable that the power source be disconnected when starting, or if it falls below a given R.P.M., in order to prevent stalling. There are many other applications, for instance, on automatic washers, where a single motor may be connected to several loads, one of them with relatively low torque requirements, and another with high torque requirements. If the latter is connected thru a centrifugal clutch, it permits the use of a less expensive motor with lower starting torque availability. Low starting torques permit the use of shaded pole or permanent split capacitor motors, and these make possible motor speed control through voltage change, wave clipping, or frequency modulation. Motor speed change, coupled with a centrifugal clutch, permits automatic control of load connection, often eliminating an extra motor which would otherwise have to be used.

There are, in general, two types of loads to be coupled to a power source, low inertia and high inertia. A good example of a low inertia load is a hydraulic pump where the gears or impellors usually have relatively low mass. A good example of a high inertia load is a large Sirrocco type blower wheel which has a relatively high mass. The low inertia loads can be accelerated very rapidly with a self-energizing type of clutch which grabs and holds, but high inertia loads are best accelerated gradually to avoid high stresses on the driving parts, which require a clutch capable of picking up the load gradually.

These and other objects will be seen from the following specification and claims in conjunction with the appended drawing in which:

Figure 1:
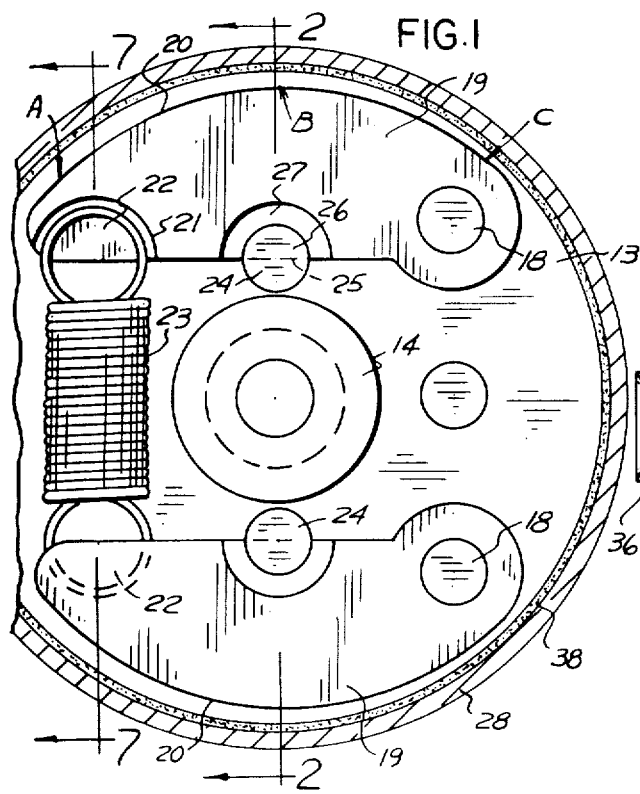
FIG. 1 is a fragmentary partially sectioned view taken in the direction of arrows 1—1 of FIG. 2.
Figure 6:
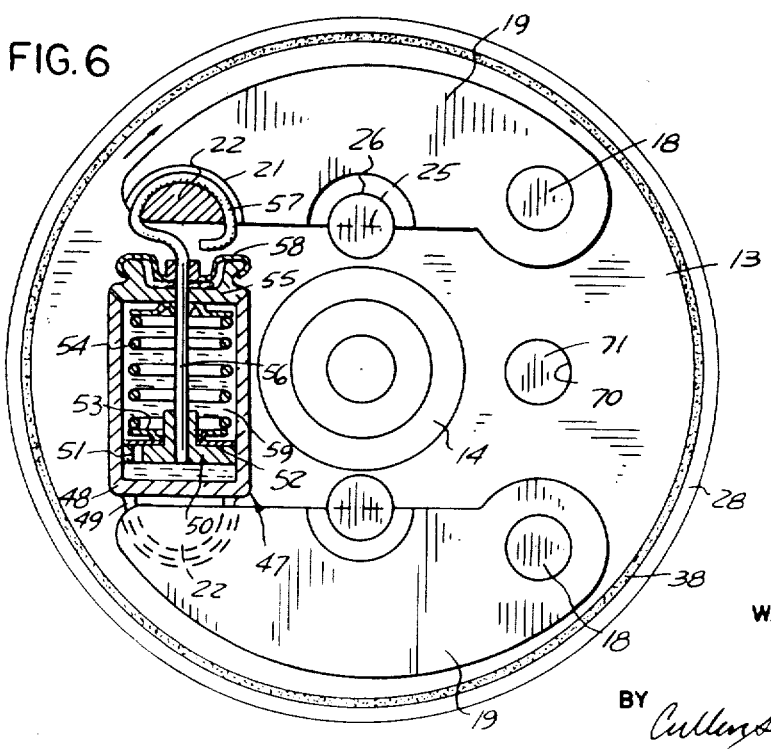

FIG. 6 corresponds to FIG. 1 showing a modification thereof.

Figure 7:
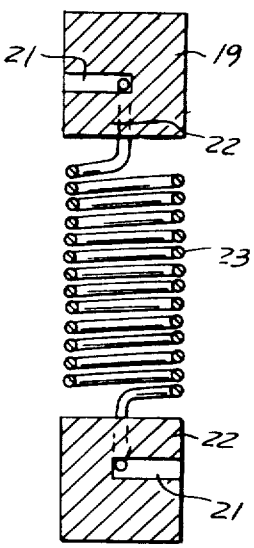

FIG. 7 is a fragmentary section taken in the direction of arrow 7—7 of FIG. 1.

Figure 8:
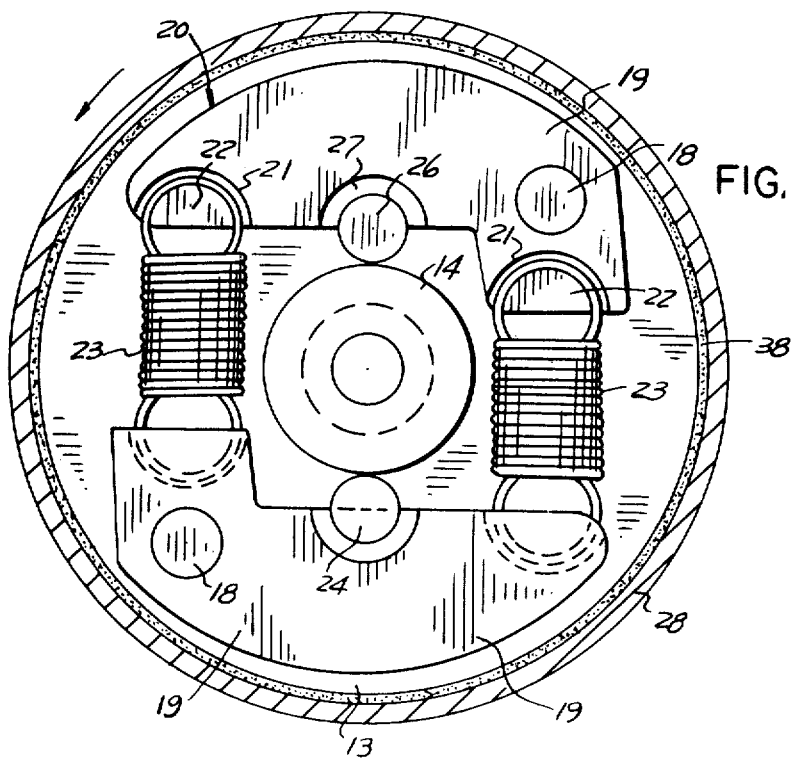

FIG. 8 is a view corresponding to FIG. 1 illustrating a modified clutch.

Figure 2:
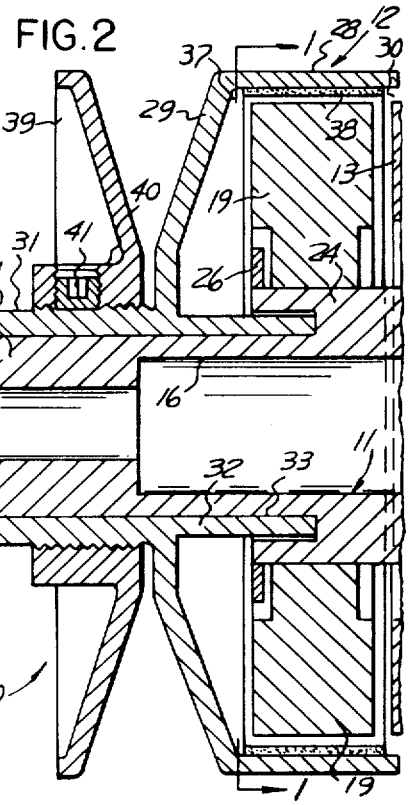
FIG. 2 is a longitudinal section of the present centrifugal clutch taken in the direction of arrows 2—2 of FIG. 1.
Figure 3:
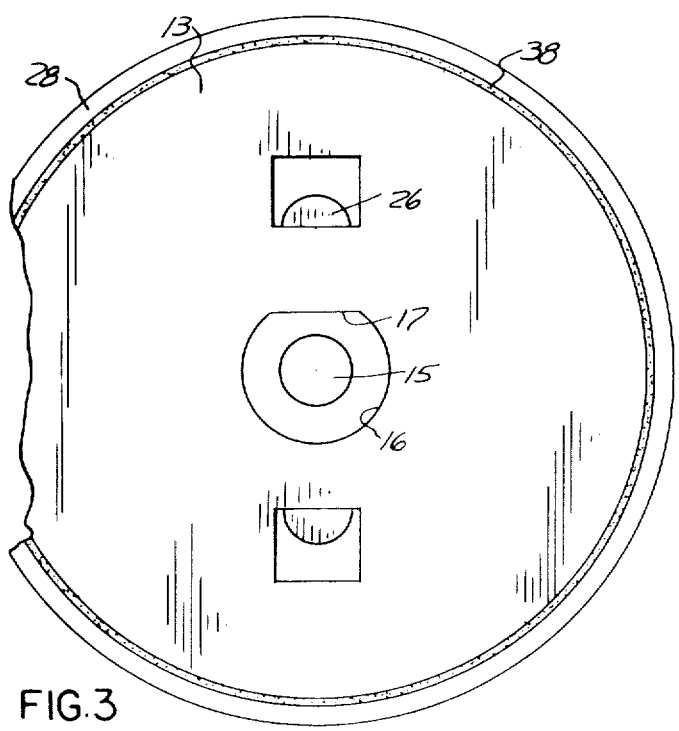
FIG. 3 is a rightside elevational view thereof.

Referring to the drawings, FIGS. 1, 2 and 3 illustrate one form of self-energizing centrifugal clutch generally designated at 10 FIG. 2 and including drive member 11 and driven member 12. Said drive member includes a disc 13 which is centrally apertured and projecting from one side the hub 14 which has central bore 15 terminating in counter bore 16, the latter being suitably splined or provided with a flat as at 17 FIG. 3 adapted to receive a prime mover such as a power-driven shaft. The hub may be restrained from linear movement by the use of a conventional radial set screw or a fastener upon the end of the drive shaft, not shown.

A pair of pivot hubs 18 form a part of and project at right angles from disc 13, as at FIG. 1. A pair of symmetrical oppositely arranged weights 19 are apertured at their one ends and mounted upon hubs 18 adjacent disc 13 FIG. 2. The outer working surfaces of the weights are arcuate as at 20 and there is provided a normal working surface A-B which is remote from pivot 18 normally adapted for uniform frictional registry with a friction surface 38 hereafter described. Said arcuate surfaces are so shaped that these surfaces as at A-B will be substantially uniform in curvature for registry with the friction material 38. This contact A-B will occur at the maximum distance from pivot 18 and is such that depending upon the direction of rotation of the drive member 11 one of the weights 19 has a distinct tendancy to be rotated about its pivot 18 and forced into harder contact pressure with the friction member 38, whereas the other weight has the opposite effect. The former tendancy is referred to as "self-energizing."

Thus the weights 19 shown in FIG. 1 provide a clutch which is "self-energizing" regardless of the direction of rotation of the drive member 11.

The outer end of each weight remote from its pivot on one side thereof has an arcuate slot 21 therein which extends approximately midway of its width to define an arcuate post 22. As for example, the upper weight shown in FIG. 1 with the post for illustration extending toward the reader. The corresponding opposing weight 19 is of the same construction, but is positioned so that its arcuate recess is upon the opposite side so that the post defined at 22 extends in the opposite direction. Thus the two posts 22 are adapted for connection to the opposite looped ends of the coil tension spring 23 for normally holding the weights in the inoperative or release position shown. In this position the respective weights bear against the corresponding flat surface 25 of the semi-cylindrical stop posts 24 which project from disc 13.

Circular lip 26 upon the outer end of the said post 24 registers with a corresponding arcuate recess 27 formed in the respective weights in order to guidably receive said weights and to limit their motion to radial movements within the confines of drum 28.

The stops 24 are supported at the hub 14 and are integral with it for approximately one-half of their length to thus provide a solid stop and to prevent stresses on the disc 13 through cantilever action.

The driven member 12 of the centrifugal clutch includes a cylindrical drum 28 FIG. 2 which is closed by a substantially angular but radial web 29 at one end and is open at 30 at its other end FIG. 2. The drum 28 includes axial hub 31 which projects from one side of web 29, and a hub extension 32 extending from its opposite side and which cooperatively nests within an annular slot 33 formed within hub 14 adjacent the posts 24.

In the assembly shown in FIG. 2, this construction limits relative endwise movements between drive member 11 and driven member 12 in one direction. Hub 14 includes a reduced extension 34 over which is mounted washer 35 retained in position by the turned over end portion 36 FIG. 2, said washer serving to restrain the members in the opposite direction.

Drum 28 within its cylindrical portion includes the bore 37 upon which is mounted a suitable friction sleeve 38 employing a suitable adhesive as desired and which could be of any epoxy or other resin or other suitable adhesives. The material of the sleeve 38 may be of bonded cork for low inertia loads where there is little slippage in the clutch, or made of bonded asbestos where there is much slippage as on high inertia loads. This material completely covers the inner surface of the drum 28. This has the advantage of providing more friction surface to wear than a small piece of such friction surface mounted upon the weights. It furthermore permits the drum 38 to be made of materials which are readily and cheaply produced such as plastic or die-castings otherwise not suitable for friction surfaces.

In cooperation with inclined surface portions of web 29 FIG. 2 there is provided a correspondingly and oppositely tapered pulley element 39 having a central hub 40 which is adjustably threaded or otherwise secured upon drum hub 31 fixedly secured thereto as by set screw 41.

Thus there is shown in FIG. 1 one means for transmitting motion from the driven member 12, namely, the use of a pulley. It is understood that the pulley assembly 29–39 could be formed as a unit integral construction as a part of the drum assembly 12.

Figure 4:
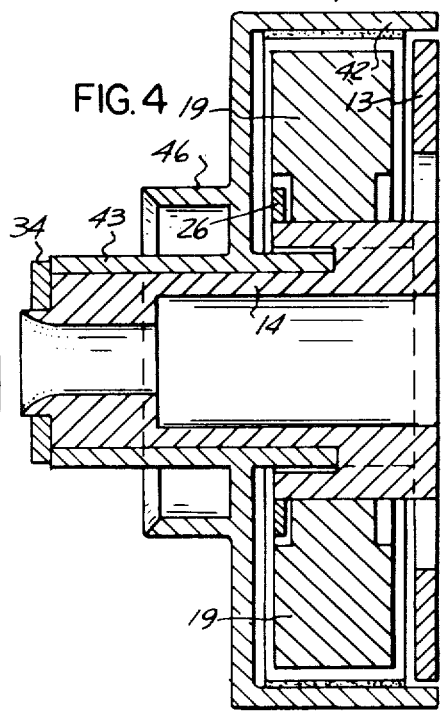
FIG. 4 is similar to FIG. 2 showing a modification.

Other forms of coupling from the driven member are possible as for example in the similar centrifugal clutch assembly shown in FIG. 4.

Figure 5:
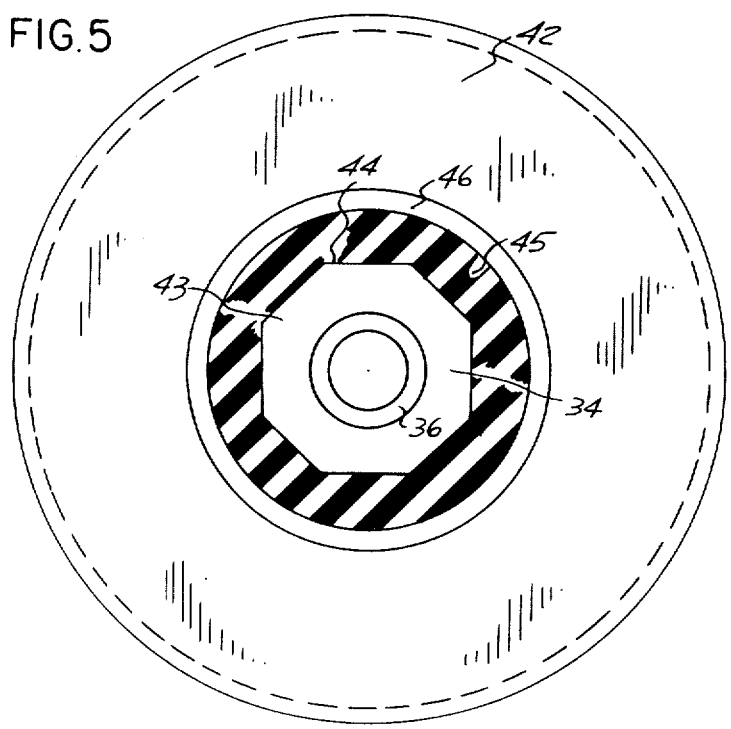
FIG. 5 is an end elevational view thereof, with removable flexible coupling member shown in cross section.

Here the driven member which includes drum 42 is a slightly different shape from the drum 28 of FIG. 2 and includes a hub 43 whose exterior surface is irregularly shaped such as polygonal as at 44 FIG. 5 or which could be splined so as to snugly receive thereover a similarly shaped flexible coupling member such as shown at 45 for transmitting rotative motion. The shroud 46 of cylindrical form FIG. 4 extends around a portion of the length of the hub 43 and is adapted to snugly and cooperatively receive external cylindrical surface of the coupling member 45 FIG. 5 so as to prevent slippage and to prevent distortion of the coupling member in operation and this also prevents slippage of a coupling member under sudden loads.

It is noted that the clutch weights 19 FIG. 1 are not pivoted diagonally opposite each other, as shown in FIG. 8, but are placed parallel to each other with the pivots 18 on the same perpendicular axis. The other ends of weights 19 are therefore opposite each other on a perpendicular axis and can be restrained by only the single spring 23.

In referring to FIG. 1, it is noted that by changing the outer contour A-B of the weight 19 and shifting the area of contact to the area of B-C, there will be a decrease in the self-energizing effect and render the clutch more suitable for higher inertia loads. On the other extreme, a centrifugal clutch with more self-energizing effect may be constructed as shown in FIG. 8, where the direction of rotation of the weights 19 need be specified. In this case counter-clockwise. With both weights self-energizing, the maximum amount of torque would be transmitted to the driven member 12.

It is often desirable on centrifugal clutches to have a time delay on closing after the clutch has obtained its maximum speed. This is particularly desirable in order to obtain correct sequence of operation where the motor or other prime mover is coupled to two separate loads and the second load should not be coupled until a short interval after maximum speed is attained. Such clutches have heretofore been very expensive. FIG. 6 however illustrated a form of centrifugal clutch which can be adapted to delayed operation at small expense. Instead the single spring 23 FIG. 1 is removed and a single spring controlled dash-pot 46 substituted. While it would operate with two dash-pots, the single dash-pot design makes it practical. Also note that with a single dash-pot controlling two weights, the movement is doubled in the piston and the control less critical.

The latter consists of a cylinder 48 preferably of molded plastic with an attached semi-circular ring 49 on its closed end for attaching to the spring post 22 of the weight 19. Within this cylinder is a clost fitting piston 50 which has a number of small apertures 51 adjacent and around its periphery. These holes are covered on the top side FIG. 6 by a thin disc of spring metal to form the valve 52. The latter is held on by washer 53 upon which rests compression spring 54. Tightly closing the end of the cylinder is a cap 55 which is permanently attached. Piston rod 56 suitably fastened into the piston extends through cap 55 and terminates in the hook 57 adapted for connection with the corresponding post 22 of the upper weight 19.

The piston rod is sealed by the flexible closure 58 which also has a snug fit over the outside of cap 55. The entire cylinder is filled with a silicone fluid 59 of suitable viscosity to give the time delay required.

In operation as the disc 13 is rotated and approaches operating speed, the centrifugal force of the weights 19 overcomes the force of the spring 54, but before the weights can move outward silicone fluid 59 must pass by piston 50. This can be a slow process depending upon the viscosity of the fluid, and delays of considerable extent can be had before contact of the weights with the friction lining 38 FIG. 6. These delays are often useful. As the piston 50 and rod 56 move outward, the central boss of the elastometer seal 58 moves with it. However, the total volume inside the cylinder must remain constant, so the outer part of the seal moves down into the cylinder. Also, the piston, spring and fluid are heavier than the spring 23, FIG. 1. To compensate for this, drive disc 13 is provided with an aperture 70 upon its opposite side into which the weight 71 is inserted and secured to compensate and to maintain a balance. It is noted that on stopping the delayed action clutch, the piston 50 can return rapidly to initial position FIG. 6 because the apertures 51 in the piston lets the fluid through freely merely raising the thin valve member 52 and thus a rapid disengagement of the clutch results.

A modified centrifugal clutch is shown in FIG. 8 wherein mounted upon the disc 13 are a pair of oppositely arranged weights 19. These weights are pivotally mounted upon the diametrically arranged posts 18 which project from said disc.

The stop pillars or posts 24 which limit inward movements of the weights 19 to inoperative "release position" are the same construction as the posts 24 shown in FIG. 1.

The respective opposite ends of the weights 19 in this illustration have arcuate grooves 21 formed therein on the respective opposite sides of adjacent weights providing the supporting posts 22 similar to what was shown and described in FIG. 1 for receiving therebetween the respective pair of tension springs 23. In this case instead of a single spring as shown in FIG. 1 there are provided a pair of such springs in view of the diametric pivotal mounting of the respective weights. In this case the centrifugal clutch is self-energizing only if the weights are rotated in a counter clockwise direction.

In the present disclosure the weights 19 may be formed of powdered metal or die-cast without subsequent machining. Thus the entire construction lends itself to high speed economical low cost fabrication.

Low inertial loads can be started with the completely self-energizing clutch such as shown in FIG. 8 and moderate inertial loads with the dual rotation centrifugal clutch as shown in FIG. 1.

If desired, the clutches may include compression springs and provide a fixed mechanism torque in one direction, though due to a different self-energizing effect, a possibly different value torque in the opposite direction. Except for the springs, the construction is identical.

Such clutches are widely used in washing machines, and the present construction would be particularly economical.

While there is shown in FIG. 2 driven member 12 journalled to drive member 11, it does not need to be. They could be mounted on separate shafts on the same axis adjacent to each other, say a motor shaft and a pump shaft, yet still retain all the features above defined.

Having described my invention, reference should now be had to the following claims.

I claim:

1. In a centrifugal clutch, a drive member including an apertured disc and central hub adapted to receive a drive means;

a pair of parallel spaced pivot hubs on one side of the disc;

a pair of oppositely arranged weights at their one ends pivoted on said hubs respectively;

their outer working edges being arcuate;

a spring interconnecting the other ends of the weights;

stops on said hub limited inward "release" positioning of said weights;

and a driven member including an apertured drum loosely surrounding and spaced from said disc and weights and a hub journalled upon said disc hub;

means to prevent relative endwise movement of said hubs;

coupling means on said drum hub;

and a sleeve of friction material secured upon the interior of said drum normally spaced from said weights;

said drum including a radial web, the means to prevent endwise relative movement of the hubs including an annular recess in the disc hub cooperatively receiving one end of the drum hub;

said one end of the drum hub extending axially into said drum;

and a washer secured upon the other end of said disc hub loosely engaging said drum hub at its other end.

* * * * *